Figure 1:
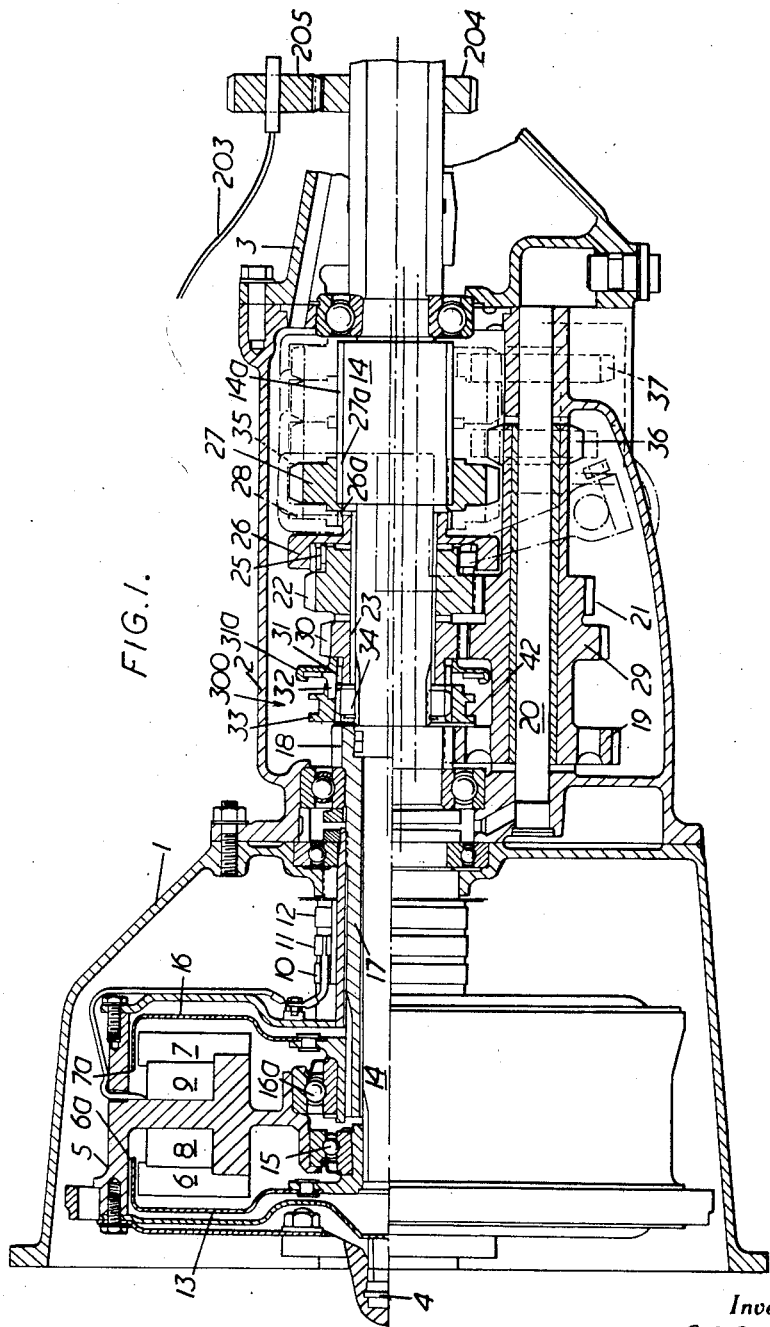

Aug. 22, 1961  C. S. STEADMAN ET AL  2,997,143
TRANSMISSION SYSTEMS
Filed June 10, 1958  3 Sheets-Sheet 1

Inventors:
C. S. STEADMAN &
C. HENDERSON
By Moore & Hall
Attorneys

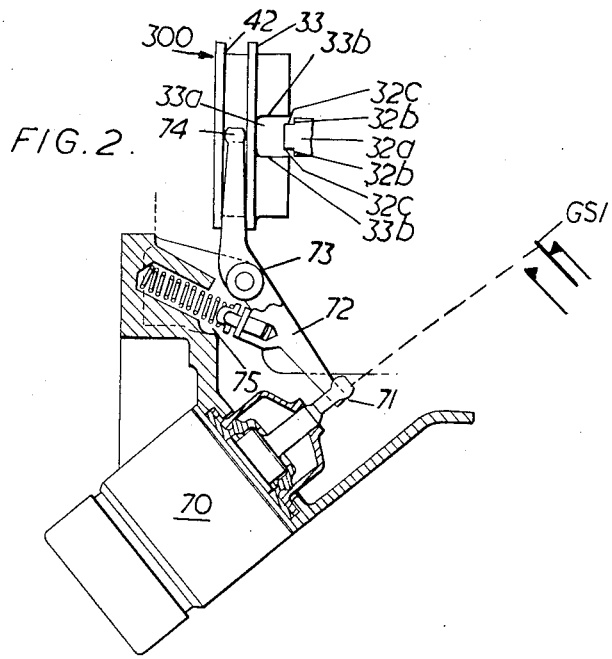
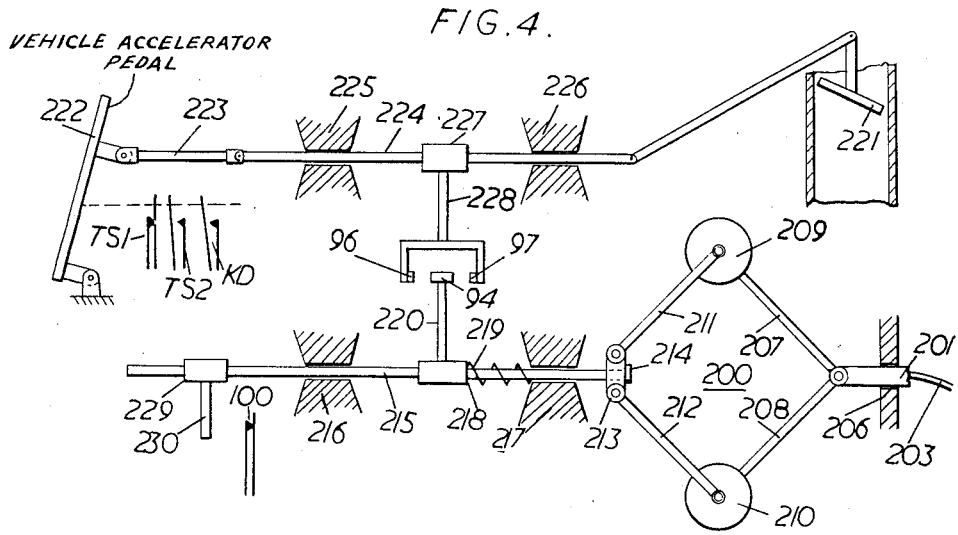

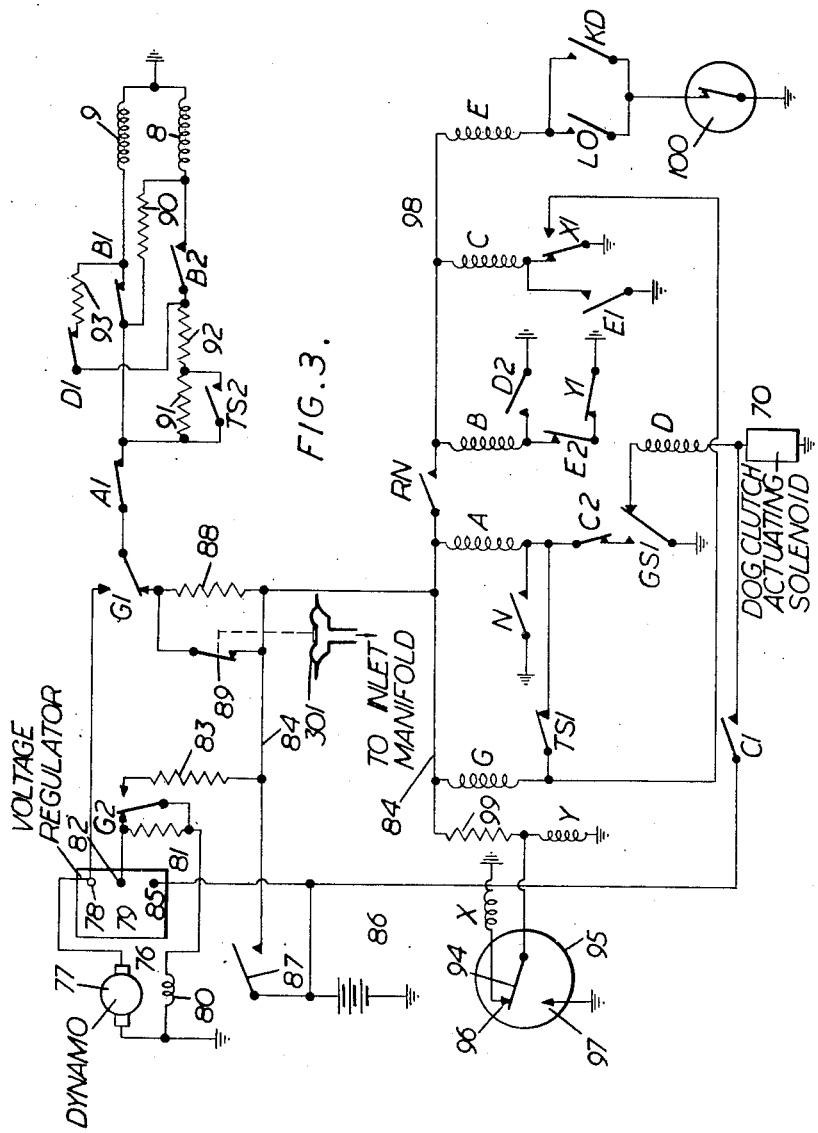

United States Patent Office 2,997,143
Patented Aug. 22, 1961

2,997,143
TRANSMISSION SYSTEMS
Clifford S. Steadman, 5 Kelvin Grove Brook Road, Surbiton, England, and Cyril Henderson, 102 The Crofts, Witney, England
Filed June 10, 1958, Ser. No. 741,120
Claims priority, application Great Britain Dec. 10, 1953
16 Claims. (Cl. 192—.073)

This application is a continuation-in-part of our prior application No. 474,537, filed December 10, 1954, now abandoned.

The present invention relates to systems for the transmission of power from a prime mover to a load wherein the velocity-ratio of the transmission may be varied by discrete steps. It is particularly applicable to power transmission systems for motor vehicles. Many such transmissions suffer from the disadvantage that when the prime mover is accelerating the load it is necessary to cease transmission of power to the load when an upward change of ratio is made.

It is accordingly an object of the present invention to provide means to enable an upward change of ratio to be made without the cessation of transmission to the load.

According to the present invention a power transmission system comprises a first clutch capable of slipping having first input and output members, the first input member being adapted to be driven by a prime mover and the output member being connected to an output shaft supplying power to a load through high ratio transmission means, a second clutch capable of slipping having second input and output members, the second input member being adapted to be driven by the prime mover, the second output member being connected to the output shaft through low ratio transmission means, said low ratio transmission means incorporating a free wheel device, said second output member being also connectable to the output shaft through intermediate transmission means having a ratio intermediate between said high and low ratio means, said intermediate transmission means incorporating a dog clutch, actuating means for said dog clutch, operation of said actuating means in a first sense giving engagement of said dog clutch when the driving and driven members thereof are in synchronism and operation in the second sense giving disengagement of said dog clutch, means to produce operation of said actuating means in their first sense and simultaneous engagement of said first clutch and means to de-energise said first clutch upon engagement of said dog clutch, whereby the second clutch being engaged, transfer from the low to the intermediate ratio may be effected.

It will be seen that upon energisation of the first clutch when the second clutch is also engaged power will be supplied from the prime mover to the load over the high ratio means (the first clutch slipping), so that the prime mover, the driving and driven members of the second clutch and the driving member of the dog clutch will slow down, the free wheel will over-run, and the driven member of the dog clutch (which, prior to energisation of the first clutch, was rotating more slowly than the driving member) will continue to rotate with little variation in speed owing to the inertia of the load and the supply of energy thereto by the prime mover. A point will be reached at which the driving and driven members of the dog clutch are in synchronism, when the dog clutch will engage. The first clutch will then be disengaged and thereafter the drive will be continued at the intermediate ratio through the second clutch.

The actuating means for the dog clutch preferably include a baulking ring between the driving and driven members, this preventing engagement unless the driving and driven members are in synchronism.

The first and second clutches may be of any convenient kind, but are preferably of the kind in which power is transmitted through a mass of finely divided ferromagnetic material upon energisation of an electrical winding forming part of the clutch, the torque which the clutch is capable of transmitting without slipping depending upon the energisation.

A transmission system giving automatic gear changes between three ratios suitable for use in a motor vehicle having a conventional throttle-controlled petrol engine and embodying the present invention will now be described with reference to the accompanying drawings of which
FIGURE 1 shows a section on the centre-line of the clutch and gear box assembly,
FIGURE 2 shows a detail of the operation of the dog clutch,
FIGURE 3 shows the electrical circuit of the system,
FIGURE 4 shows in further detail the means whereby certain contacts shown in FIGURE 3 are actuated.

Referring first to FIGURE 1, the clutch and gear box assembly is contained in a clutch housing 1, gear box housing 2 and tail shaft housing 3.

Input shaft 4 is connected to the engine crank shaft, and carries a generally cylindrical driving member 5 of ferromagnetic material which is common to the first and second clutches and also constitutes the engine flywheel. Member 5 carries two polepiece members 6 and 7 and two electrical windings 8 and 9 which are arranged to energise magnetic circuits containing pole piece members 6 and 7 respectively, the flow of current in the windings resulting in the production of magnetic fields across the air gaps 6a, 7a, respectively. It will be noted that a considerable part of member 5 is common to the two magnetic circuits associated respectively with windings 8 and 9. Air gaps 6a, 7a are partially filled with powdered ferromagnetic material. Electrical connection to windings 6 and 7 is made via slip rings 10, 11, 12 (one of these being grounded and common to the two windings). 13 indicates the driven member of the first clutch, which is cup-shaped in form and has its peripheral portion disposed in gap 6a. Member 13 is attached to one end of a solid shaft 14, which constitutes the output shaft of the transmission, and passes centrally through member 5. Shaft 14 is connected to the road wheels of the vehicle. The direct connection between member 13 and shaft 14 constitutes the high ratio transmission means. Relative rotation of members 5 and 13 is permitted by ball bearing 15. 16 indicates the driven member of a second clutch, which is attached to a hollow shaft 17 surrounding shaft 14. Relative rotation of 7 and 16 is permitted by a further ball bearing 16a. The end of hollow shaft 17 remote from driven member 16 lies within housing 2, and carries, solidly attached thereto, a gear 18. Gear 18 is in permanent mesh with a gear 19 carried on a layshaft 20 whose axis is parallel to those of shafts 14 and 17. Gear 19 is solidly connected to various further gears 21, 29, and 36. Gear 21 is permanently in mesh with gear 22 which is rotatable with respect to a sleeve 23. Sleeve 23 is coaxial with, and rotatable with respect to, shaft 14. Gear 22 is formed integrally with the driving member of a free wheel mechanism 25, the driven member of the free wheel 26 being also rotatably carried by sleeve 23. A gear 27 is slideably mounted upon an enlarged portion of shaft 14 which is provided with splines 14a engaging with corresponding internal splines 27a on gear 27. Free wheel member 26 is provided with splines 26a similar to splines 14a. Member 26 may be clutched to shaft 14 by sliding gear 27 into the position indicated (by broken lines) at 28. This is in fact the normal condition of operation. The position of gear 27 is controlled in a conventional manner by means of a yoke 35.

Gear 29 is permanently in mesh with a further gear 30, also rotatably carried by sleeve 23. Gear 30 is provided with an externally splined portion 31 forming the driving member of the dog clutch referred to earlier and which is generally indicated at 300. A splined ring 34 attached to shaft 14 adjacent gear 30 has external splines similar to those of portion 31, and forms the driven member of the dog clutch 300. The driving and driven members may be connected together by internally-splined sliding member 33, the engagement of portion 31 and member 33 being controlled by a baulk ring 32 which prevents engagement between 31 and 33 if they are rotating at different speeds.

The arrangement of the driving and driven members of the dog clutch, the internally-splined member 33 and the baulk ring 32 form a coupling such as is described in British Patent No. 640,227 and corresponding U.S.A. Patent No. 2,532,648, Tarlton. In this form of coupling, the splined member 33 is formed with a number of cut-outs 33a having axially-directed flanks 33b (FIGURE 2). The baulking member 32 is formed with axially-directed teeth 32a, corresponding to cut-out portions 33a, and of such a shape and so positioned that they are a sliding fit in the cut-out portions 33a and, when fitting in those portions, engagement of the splines on member 33 with those on portion 31 is possible, but when not fitting in those portions such engagement is prevented. Teeth 32a are formed towards their ends with shoulders 32b, and a narrow terminal portion with flanks 32c. Baulking ring 32 is frictionally engaged by a member 31a also carried on the splines of portion 31 (FIGURE 1).

Thus, if portion 31 and ring 34 are rotating at different speeds (the dog clutch of course being disengaged), one or other of flanks 32c will engage with one or other of flanks 33b, baulking ring 32 slipping in relation to member 31a. The application of axial force to the right (in FIGURES 1 and 2), i.e. in the sense to produce engagement of the dog clutch, will in these conditions merely result in engagement of shoulders 32b with member 33. However as portion 31 and ring 34 pass through synchronism the shoulder 32b will slip in relation to member 33, until a position is reached where teeth 32a can enter cut-outs 33a. Then under the applied axial force, member 33 will move to the right and driving connection between ring 34 and portion 31 will be established. It will be seen that this kind of coupling not only establishes connection between the driving and driven members when these are synchronised, but also provides, by the axial movement of member 33 (and corresponding movement of any other member connected to it) means responsive to the attainment of synchronism between the driving and driven members.

Engagement of the dog clutch 300 is controlled by a spring loaded solenoid 70. The armature of the solenoid is in pivotal engagement, at 71, with one end of one arm of a crank 72, pivotally mounted on housing 2 at 73. The free end of the other arm of the crank is provided with a pin 74 engaging with an external circumferential groove 42 formed in member 33. Crank 72 is loaded by a helical spring 75 in such a sense as to tend to disengage the dog clutch 300, i.e. to move member 33 to the left in FIGURES 1 and 2. Thus energisation of solenoid 70 produces a force acting to the right on member 33 and results in engagement of the dog clutch 300 when the driving and driven members are synchronised. Movement of the armature of solenoid 70 also controls a moving contact GS1, engaging with one or other of two fixed contacts according as to whether the dog clutch 300 is completely engaged or disengaged.

In addition to being positioned to clutch member 26 to shaft 14, gear 27 may be positioned to engage with gear 36 (to give an emergency low gear) or with a gear 37 on an auxiliary lay shaft driven by gear 36 to give a reverse drive. The means by which gear 27 is positioned are quite conventional. They are indicated in broken lines and will not be further described. It will be seen that the direct connection of member 13 to shaft 14 provides the high ratio transmission referred to earlier, and, as wheel 22 is of greater diameter than wheel 21, the transmission via gears 18, 19, 29, 30 provides the intermediate ratio transmission while the transmission via gears 18, 19, 21 and 22 provides the low ratio transmission.

Referring now to the circuit diagram of FIGURE 3, in which various relay operating coils are indicated by a letter, the corresponding contacts being indicated in a conventional manner by the same letter followed by a number, power for the actuation of the various relays is obtained from the usual dynamo, indicated at 76, driven by the vehicle engine. The armature 77 of the dynamo has one terminal grounded and the other connected to a terminal 78 of a conventional voltage regulator 79. Dynamo 76 has a field winding 80 of which one terminal is grounded. Its second terminal is connected through a resistor 81 to a further terminal 82 of voltage regulator 79. It is also connected to a two position moving contact G2 actuated by a relay winding G. One fixed contact associated with G2 is connected to terminal 82 and the other through a resistor 83 to a conductor 84. A third terminal 85 of regulator 79 is connected to the positive terminal of the usual accumulator indicated at 86 whose negative terminal is grounded. Terminal 85 is also connected via a switch 87 (which is in fact most conveniently the usual ignition switch for the vehicle) to line 84. Accumulator 86 is charged from dynamo 76 via the regulator 79. When resistor 81 is shorted out by G2 regulator 79 operates in the conventional manner to maintain the armature voltage substantially constant at sufficiently high engine speeds (corresponding to road speeds of more than a few miles per hour). In the other position of G2 resistor 81 is inserted in the circuit of field winding 80, and a small component of exciting current for the field is also provided via resistor 83 (if switch 87 is closed). The effect of this is that the generator voltage (at terminal 82) does not reach its normal working value until the vehicle attains a rather higher speed than is normally the case, of the order of 10 m.p.h. (16 k.m. per hour) in bottom gear for a normal passenger automobile.

Terminal 78 is connected to one fixed contact co-operating with a two-position moving contact G1. The other fixed contact is connected through a resistor 88 to conductor 84. A contact 89 normally shorts out resistor 88 and is controlled by a device sensitive to pressure variations in the inlet manifold of the engine, indicated as a pressure-responsive capsule 301, being opened when this pressure falls below some predetermined value.

Moving contact G1 may be connected through a normally-closed contact A1 and a normally-closed contact B1 to non-grounded terminal of the second clutch winding 9. The junction of A1 and B1 is connected through a resistor 90 to the non-grounded terminal of the first clutch winding 8. The junction of A1 and B1 is also connected through resistors 91 and 92 in series, normally-closed contact D1 and resistor 93 to the non-grounded terminal of winding 9. The function of 92 and D1 may be connected through normally-closed contact B2 to the non-grounded terminal of winding 8. A normally-opened contact TS2 (controlled from the usual throttle pedal 222) may short out resistor 91. Contact TS2 is closed when the throttle is more than about 25% open.

Line 84 is also connected through a resistor 99 to terminal of an operating coil Y whose other terminal is grounded. The junction of 99 and Y is connected to the moving contact 94 of a governor switch 95. The function of governor controlled switch 95 is to determine the instant at which changes between the various ratios occur. When such changes are made under the manual control of a human driver he will judge, by correlation of vehicle speed and accelerator pedal (or throttle) position, when it is desirable to make a change of ratio—for example if he desires to obtain rapid acceleration from rest he will keep the pedal almost fully depressed (so long as the clutch is engaged) and make upward changes at speeds which are high in relation to the gear engaged, whereas if he wishes to accelerate in a fairly leisurely fashion he will keep the pedal only partially depressed and make upward changes at relatively low speeds. Governor-controlled switch 95 carries out the requisite correlation automatically, and to this end moving contact 94 is positioned by a suitable device in accordance with vehicle road speed between two displaceable contacts 96 and 97. Increase in road speed results in movement of contact 94 in the direction away from contact 96 towards contact 97. One form of device suitable for the control of contacts 94, 96, 97 is shown in FIGURE 4. This comprises a centrifugal governor device, indicated generally at 200, having an input shaft 201 rotated by suitable means, such as a flexible drive schematically, indicated at 203 and gears 204, 205, (FIGURE 1) from the output shaft, 14, of the transmission. Shaft 201 is thus rotated at a rate proportional to vehicle speed. It is journalled in a bearing, indicated at 206, and pivotally attached to a first pair of similar links 207, 208. These are attached to a pair of similar fly-weights 209, 210 which are pivotally connected, by a further pair of similar links, 211, 212, to a yoke 213 which is rotatable about the axis of a rod 215, whose axis is aligned with that of input shaft 201. Rod 215 is moveable axially, but not rotatably, with respect to guides 216, 217. A lead 214, formed at one end of rod 215, engages yoke 213, so that outward motion of weights 209, 210 produces, via links 211, 212, longitudinal motion of rod 215. Rod 215 carries a collar 218, and a helical spring 219 engages at one end collar 218 and at the other guide 217. An arm 220, of insulating material, is carried by collar 218 and carries contact 94 at the end remote from collar 218.

The vehicle engine is controlled by a conventional throttle, indicated at 221, controlled by a conventional accelerator pedal, indicated at 222, through a generally conventional linkage indicated at 223. The position of the pedal, as controlled by the driver, is indicative of the torque he wishes the engine to develop, i.e. the torque, or acceleration, he demands. However, the linkage includes a rod 224 slideably but not rotatably mounted in guides 225, 226, generally similar to rod 215 and parallel therewith. Rod 224 carries a collar 227 supporting an insulated arm 228, branched at the end away from collar 227. The ends of the branches lie on either side of contact 94. At the end of one is mounted contact 96 and at that of the other contact 97.

It will thus be seen that the position of contact 94 depends upon the vehicle speed, and the position of contacts 96 and 97 upon that of pedal 222, or, what comes to the same thing, upon the position of throttle 221. The speed response of the centrifugal device 200 and the linkage 223 between the pedal 222 and throttle 221 are such that contacts 94 and 96 are engaged when first (i.e. normal driving first) gear is required, disengagement of 94 and 96 occurs when it is desirable to change from first to second and engagement of 94 and 97 occurs when it is desirable, in normal driving conditions, to change from second gear to third in view of the considerations discussed above. Thus, when second gear is called for contact 94 is between contacts 94 and 97. Contact 94 is connected to the non-grounded terminal of relay operating coil Y. Contact 96 is connected to the non-ground terminal of relay operating coil X, and contact 97 is grounded.

Line 84 is connected also to one terminal of relay operating coil G. The other terminal of G is connected to one fixed contact co-operating with moving contact X1 and also to normally closed contact TS1 (opened on depression of the throttle pedal 222 beyond the idling position).

Line 84 is connected also to one terminal of relay operating coil A. The other terminal of coil A is connected to contact TS1; to one terminal of normally open switch N (whose other terminal is grounded) and to normally closed contact C2. Contact C2 is also connected to one fixed contact co-operating with contact GS1 (which is itself grounded). The second fixed contact co-operating with GS1 is connected to one terminal of relay operating coil D. The other terminal of that coil is connected to one side of normally open contact C1, together with the non-grounded terminal of solenoid 70. The other side of C1 is connected to terminal 85.

Line 84 may be connected, through switch RN, to line 98, which is connected to one terminal of each of operating coils B, C, E.

The other terminal of coil B may be connected to ground either through normally-open contact D2, or through normally-closed contacts E2 and Y1 in series.

The other terminal of coil may be connected to ground through normally open contact E1, and is also connected to the second fixed contact co-operating with contact X1, which is also grounded.

The other terminal of coil E may be connected through either switch LO (which is manually-operated), or switch KD (which is operated by the accelerator pedal 222, being closed when that pedal is fully, or almost fully, depressed, but otherwise open) to one terminal of normally closed switch 100, whose other terminal is grounded. Switch 100 is controlled by a governor (driven either directly from the engine or in accordance with vehicle speed) and opened when the vehicle speed (in top gear) is such that damage might result to the engine if second gear were engaged. The governor may conveniently be concluded in the device for controlling contacts 94, 96, 97, in the manner shown in FIGURE 4. There a further collar 229 is attached to rod 215 and carries an insulated arm 230 which, engages with and opens switch 100 at and above speeds such that engagement of second gear might damage the engine.

The manner of operation of the system will now be described. All the relay contacts as they appear in FIGURE 2 are shown in the positions assumed when the corresponding operating coils are de-energized. In addition contacts TS1 and TS2 are shown in the positions assumed when the throttle pedal 222 is fully released, i.e. under idling conditions, and contact GS1 is shown in the position assumed when the dog clutch 300 is disengaged. Switch RN is closed, except when reverse or emergency low gear is engaged or the transmission is in neutral, and switch N is open except when the transmission is in neutral.

The sequence followed in starting from rest with the engine stationary will first be described.

(1) Switch 87 closed, energising line 84. Operating coils X, Y, energized, coil X being energized via resistor 99 and contacts 94 and 96 and coil Y being energised via resistor 99. Operating coils G (via X1) and A (via X1, TS1) energised. Contact G1 connects A1 to 78 (dynamo output), contact G2 connects the dynamo field winding 80 to 84 via 83, and it is also connected to 82 via 81. Contact A1 isolates clutch windings 8, 9, etc. Engine started.

(2) Switch RN closed, but operating coils B, C, E remain de-energised.

(3) Throttle pedal depressed, causing engine speed to rise, and raising voltage at terminal 78. Operating coil A de-energised (TS1) so clutch winding 9 is energised via B1 and winding 8 is energised via resistor 90. The rear clutch is thus energized, giving transmission of drive to member 16. Resistor 90 is such that the energisation of winding 8 produces a flux in air gap 6a in the opposite sense and substantially equal in magnitude to that due to flux leakage from winding 9. Thus no drive is transmitted to member 13. Drive is transmitted to the output shaft 14, via gears 18, 19; 21, 22; free-wheel 25 and splines 26a, 27a and 14a. Resistors 81, 83 ensure that the dynamo output voltage (at 78) rises with engine speed in such a manner that the slipping torque of the rear clutch matches the engine torque, so as to give smooth starting of the vehicle from rest. The output reaches its normal working voltage (corresponding to full engagement of the rear clutch) at about 10 m.p.h.

(4) When the vehicle has accelerated and road speed and the position of pedal 222 and throttle 221 are such that a change to second gear is required, the relative positions of 94 and 96, positioned by the means discussed above, are such that 94 moves out of engagement with 96. Operating coil X is de-energised, operating coil G is de-energised (X1), and operating coil C is energised (X1). Coil Y remains energised via resistor 99, contact 94 being between contacts 96 and 97. Contact A1 is then connected to line 84 (G1) either directly or via resistor 88 so that clutch energisation current is obtained from the battery. The dynamo circuit reverts to a conventional working condition (G2). Solenoid 70 is energised, tending to engage the dog clutch 300 and operating coil D is energised (C1). Operating coil B is also energised (D2), so that winding 8 is energised (via 90 and B2) and winding 9 de-energised. The front clutch is thus fully engaged; but the rear clutch remains partially engaged because of leakage flux in gap 7a due to the current in winding 8. The engine is therefore slowed down, by reason of its direct (but slipping) connection to the road wheels through 13 and 14, and free wheel 25 over runs. A condition will be reached in which the driving and driven members of the dog clutch 300 are in synchronism, whereupon the dog clutch 300 will be permitted to engage by the baulk ring 32. Contact GS1 will thereupon change over, de-energising operating coil D and B (D2). Winding L will be energized through A1 and winding H through resistor 90. Thus drive is transmitted to 14 via gears 18, 19; 29, 30; and the dog clutch (comprising members 31, 32, 33 etc.). Freewheel 25 continues to over-run.

(5) When road speed and throttle position are such that a change to third gear is required, 94 moves into engagement with 97. Operating coil Y is thus de-energised (being shorted out so that current flowing through resistor 99 flows direct to ground through contacts 96 and 97 instead of through coil Y). Operating coil B is thus energized (Y2), and winding 8 energised via 91, 92 and B2, winding 9 being energized via D1 and resistor 93. The energisation of winding 9 is sufficient to reduce the flux in gap 7a substantially to zero.

(6) Downward changes from third gear to second under normal conditions are accomplished under the control of governor 95 by the reversal of the process set out under (5) above.

(7) Downward changes from second gear to first occur when 94 engages with 96. Coil X is thereupon energised, and coil C and solenoid 70 de-energised. As the dog clutch is in engagement at this stage, A is energised via C2 and GS1, opening contact A1 and de-energising both windings 8 and 9. The load is thus removed from the dog clutch, so that it is readily withdrawn by spring 75. Disengagement of the dog clutch results in de-energisation of coil A and re-energisation of windings 9 and 8 as described under (3) above, so that the drive is transmitted through free-wheel 25 etc.

Switch LO is manually operable by the driver and switch KD is operated when the throttle pedal is fully depressed. Provided that switch 100 is not open, closure of either switch results in energisation of coil E, de-energisation of coil B (by opening E2) and energisation of coil C (via E1). Second gear is thus engaged (either usually for braking purposes by operation of LO or for increased acceleration by operation of KD) if it is safe to do so, and remains engaged so long as E is energised.

Switch 89 opens under low inlet manifold pressure, i.e., low torque, conditions, and thus under those conditions energisation of windings L and H is reduced. A reduction in the current drain on battery 86 is thereby effected.

Switch TS2 is open for small throttle openings, thus reducing excitation of winding 8 under these conditions. It is found that thereby the smoothness of changes to and from top gear under small throttle openings is materially assisted.

Switches RN, N and the mechanism for the engagement of the emergency low and reverse gears may be controlled in any convenient manner. They may for example be controlled by a lever having "normal drive," "neutral," "emergency low" and "reverse" positions, the lever controlling the gear shift mechanism for the reverse and emergency low ratio drive and a cam mechanism for operation of switches RN and N. Switch RN is only closed in the normal drive condition and N closed in the neutral condition, as mentioned earlier.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. A power transmission system comprising a first clutch capable of slipping having first input and output members, the first input member being adapted to be driven by a prime mover and the output member being connected to an output shaft through high ratio transmission means, a second clutch capable of slipping having second input and output members, the second input member being adapted to be driven by the prime mover, the second output member being connected to the output shaft through low ratio transmission means, said low ratio transmission means incorporating a free wheel device, said second output member being also connectable to the output shaft through transmission means having a ratio intermediate said high and low ratio means, said intermediate transmission means incorporating a dog clutch, actuating means for said dog clutch, operation of said actuating means in a first sense giving engagement of said dog clutch when the driving and driven members thereof are in synchronism, and operation in the second sense giving disengagement of said dog clutch, means to produce operation of said actuating means in their first sense and simultaneous engagement of said first clutch and means to de-energize said first clutch at least partially upon engagement of said dog clutch whereby, the second clutch being engaged, transfer from the low to the intermediate ratio may be effected, said actuating means for the dog clutch comprising a baulking ring between the driving and driven members thereof, preventing engagement of the clutch unless the driving and driven members are in synchronism.

2. A power transmission system comprising a first clutch capable of slipping having first input and output members, the first input member being adapted to be driven by a prime mover and the output member being connected to an output shaft through high ratio transmission means, a second clutch capable of slipping having second input and output members, the second input member being adapted to be driven by the prime mover, the second output member being connected to the output shaft through low ratio transmission means, said low ratio transmission means incorporating a free wheel device, said second output member being also connectable to the output shaft through transmission means having a ratio intermediate said high and low ratio means, said intermediate transmission means incorporating a dog clutch, actuating means for said dog clutch, operation of said actuating means in a first sense giving engagement of said dog clutch when the driving and driven members thereof are in synchronism, and operation in the second sense giving disengagement of said dog clutch, means to produce operation of said actuating means in their first sense and simultaneous engagement of said first clutch and means to de-energize said first clutch at least partially upon engagement of said dog clutch whereby, the second clutch being engaged, transfer from the low to the intermediate ratio may be effected, said system comprising means to reduce partially the engagement of the second clutch during the period that the first clutch is engaged for an upward change from the low to the intermediate ratio.

3. A system as claimed in claim 2 comprising means responsive to the disengagement of the dog clutch to control the second clutch, during a downward change from the intermediate to the low ratio, to engage the second clutch upon the disengagement of the dog clutch.

4. A power transmission system comprising a first clutch capable of slipping having first input and output members, the first input member being adapted to be driven by a prime mover and the output member being connected to an output shaft through high ratio transmission means, a second clutch capable of slipping having second input and output members, the second input member being adapted to be driven by the prime mover, the second output member being connected to the output shaft through low ratio transmission means, said low ratio transmission means incorporating a free wheel device, said second output member being also connectable to the output shaft through transmission means having a ratio intermediate said high and low ratio means, said intermediate transmission means incorporating a dog clutch, actuating means for said dog clutch, operation of said actuating means in a first sense giving engagement of said dog clutch when the driving and driven members thereof are in synchronism, and operation in the second sense giving disengagement of said dog clutch, means to produce operation of said actuating means in their first sense and simultaneous engagement of said first clutch and means to de-energize said first clutch at least partially upon engagement of said dog clutch whereby, the second clutch geing engaged, transfer from the low to the intermediate ratio may be effected, a motor vehicle propelled by an internal combustion engine controlled by a throttle wherein changes between the three ratios are effected under the control of means responsive both to throttle position and vehicle speed.

5. A power transmission system comprising a first clutch capable of slipping having first input and output members, the first input member being adapted to be driven by a prime mover and the output member being connected to an output shaft through high ratio transmission means, a second clutch capable of slipping having second input and output members, the second input member being adapted to be driven by the prime mover, the second output member being connected to the output shaft through low ratio transmission means, said low ratio transmission means incorporating a free wheel device, said second output member being also connectable to the output shaft through transmission means having a ratio intermediate said high and low ratio means, said intermediate transmission means incorporating a dog clutch, actuating means for said dog clutch, operation of said actuating means in a first sense giving engagement of said dog clutch when the driving and driven members thereof are in synchronism, and operation in the second sense giving disengagement of said dog clutch, means to produce operation of said actuating means in their first sense and simultaneous engagement of said first clutch and means to de-energize said first clutch at least partially upon engagement of said dog clutch whereby, the second clutch being engaged, transfer from the low to the intermediate ratio may be effected, the first and second clutches comprising means constructed to be controlled electrically.

6. A system as claimed in claim 5 wherein the first and second clutches are of the kind in which power is transmitted between driving and driven members through a mass of finely divided ferromagnetic material under the control of a magnetic field produced by a current flowing in an electric winding.

7. A system as claimed in claim 6 wherein the magnetic fields associated with the first and second clutches pass through a common member.

8. A system as claimed in claim 6 wherein the means for the actuation of the dog clutch comprise an electrically-energised solenoid.

9. A system as claimed in claim 5 wherein means are provided to engage the dog clutch and the second clutch irrespective of the governor means, the intermediate ratio being thereby engaged.

10. A power transmission adapted to transmit power from a prime mover to an output shaft comprising first and second energisable clutches capable of transmitting torque when slipping under conditions of partial energisation, said clutches each having an input member adapted to be driven directly by the prime mover and an output member, a high ratio transmission connecting the first clutch driven member to the output shaft, a low ratio transmission connecting the second clutch driven member and the output shaft, a free wheel in said low ratio transmission, an intermediate ratio transmission also connecting the second clutch driven member and the output shaft, said intermediate ratio transmission having a ratio intermediate those of the high and low ratio transmissions, a dog clutch having driving and driven members in said intermediate ratio transmission, said dog clutch being engageable to establish drive through the intermediate ratio transmission when its driving and driven members are in synchronism, actuating means for said dog clutch, operation of said actuating means in a first sense tending to engage said dog clutch and operation thereof in a second sense tending to disengage said dog clutch, the second clutch being engaged and the dog clutch and first clutch being both disengaged during transmission of power from the prime mover to the output shaft through the low ratio transmission, means operable, when cessation of transmission of power through the low ratio transmission and eventual establishment of transmission of power through the intermediate ratio transmission is required, to operate the dog clutch actuating means in its first sense, and simultaneously to energise partially the first clutch establishing, temporarily, driving connection from the prime mover to the output shaft through the high ratio transmission, said driving connection resulting in the synchronisation of the driving and driven members of the dog clutch, said dog clutch thereupon being engaged by its actuating means, and means responsive to such engagement of the dog clutch to de-energise the first clutch, breaking the temporarily-established driving connection from the prime mover to the output shaft through the high ratio transmission.

11. A power transmission as claimed in claim 10 comprising means to reduce partially the energisation of the second clutch while the first clutch is temporarily partially engaged.

12. A power transmission as claimed in claim 10 comprising means operable, when cessation of transmission of power through the intermediate ratio transmission and eventual establishment of transmission of power through the low ratio transmission is required, to operate the dog clutch actuating means in its second sense and simultaneously to de-energise the second clutch, said dog clutch thereupon being disengaged by its actuating means, and means responsive to such disengagement of the dog clutch to re-energise the second clutch and establish transmission of power through the low ratio transmission.

13. A power transmission for a vehicle propelled by an internal combustion engine controlled by a torque demand member and adapted to transmit power from the engine to an output shaft driving the vehicle comprising first and second energisable clutches capable of transmitting torque while slipping under conditions of partial energisation, said clutches each having an input member adapted to be driven directly by the engine and an output member, a high ratio transmission connecting the first clutch driven member and the output shaft, a low ratio transmission connecting the second clutch driven member and the output shaft, a free wheel in said low ratio transmission, an intermediate ratio transmission also connecting the second clutch driven member with the output shaft, said intermediate ratio transmission having a ratio intermediate those of the high and low ratio transmissions, said dog clutch being engageable to establish drive through the intermediate ratio transmission when its driving and driven members are in synchronism, actuating means for said dog clutch, operation of said actuating means in a first sense tending to engage said dog clutch and operation thereof in a second sense tending to disengage said dog clutch, transmission of power from the engine to the load through the low or intermediate ratio transmission when the first clutch is disengaged the second clutch is engaged and the dog clutch is disengaged for low and engaged for intermediate ratio, means responsive to torque demand member position and vehicle speed, said means, when torque demand member position and vehicle speed are indicative of a requirement to change from the low to the intermediate ratio, co-operating the dog clutch actuating means in its first sense and simultaneously partially energising the first clutch to establish temporarily driving connection from the prime mover to the output shaft through the high ratio transmission, said driving connection resulting in the synchronisation of the driving and driven members of the dog clutch, said dog clutch thereupon being engaged by its actuating means, and means responsive to such engagement of the dog cluch to de-energize the first clutch, breaking the temporarily-established driving connection from the prime mover to the output shaft through the high ratio transmission.

14. A power transmission system as claimed in claim 13, said means responsive to torque demand member position and vehicle speed, when torque demand member position and vehicle speed are indicative of a requirement to change from the intermediate ratio to the low ratio, operating the dog clutch actuating means in its second sense and simultaneously de-energising the second clutch, said dog clutch thereupon being disengaged by its actuating means, and means responsive to such disengagement of the dog clutch to re-energise the second clutch and establish transmission of power through the low ratio transmission.

15. A power transmission system as claimed in claim 14, said means responsive to torque demand member position and vehicle speed comprising first and second co-operating parts, the first part positioned by the torque demand member and the second by means responsive to the speed of the output shaft, said parts being engaged when the low ratio transmission is required to be operative and otherwise disengaged.

16. A power transmission system as claimed in claim 15, the co-operating parts being electric contacts, relays being provided controlled by said contacts to control the first and second clutches and a solenoid capable of energising the actuating means for the dog clutch, the means responsive to engagement and disengagement of the dog clutch comprising further electric contacts, said further electric contacts also being operative to control said relays.

References Cited in the file of this patent
UNITED STATES PATENTS

| | | |
|---|---|---|
| 2,525,571 | Winther | Oct. 10, 1950 |
| 2,605,650 | Winther et al. | Aug. 5, 1952 |